United States Patent Office 3,024,237
Patented Mar. 6, 1962

3,024,237
ALKENYL SUCCINIMIDES OF PIPERAZINES
Alan Y. Drummond, Richmond, Robert G. Anderson, Novato, and Frank A. Stuart, Orinda, Calif., assignors to California Research Corporation, San Francisco, Calif., a corporation of Delaware
No Drawing. Filed Aug. 24, 1959, Ser. No. 835,389
6 Claims. (Cl. 260—268)

This invention pertains to a new class of compounds particularly useful as lubricating oil addition agents. These new compounds are N-substituted alkenyl succinimides.

Alkenyl succinic anhydrides and numerous derivatives thereof are well known in the art. For example, alkenyl succinic anhydrides in which the alkenyl radical contains from 5 to 20 carbon atoms are taught as corrosion inhibitors in lubricating oil compositions. Also, products obtained by reacting such alkenyl succinic anhydrides with monoamines are taught as ferrous corrosion inhibitors for lubricating oil compositions.

However, the above known alkenyl succinimides are not useful as detergents in lubricating oil compositions. In contrast thereto, the N-substituted alkenyl succinimides described herein are new compounds which are useful as detergents in lubricating oil compositions.

Thus, it is a primary object of this invention to present as new compounds, new alkenyl succinimides which are particularly useful as detergents in lubricating oil compositions.

In accordance with this invention, it has been discovered that N-alkylpiperazine monoalkenyl succinimides derived from monoalkenyl succinic anhydrides and amine derivatives of piperazine are new compounds which are effective lubricating oil additives.

The N-substituted monoalkenyl succinimides of this invention are particularly effective as detergents in lubricating oil compositions. By the use of oil compositions containing these alkenyl succinimides, diesel and gasoline engine parts remain remarkably free of deposits and varnish even under severe operating conditions.

These new compounds, which are monoalkenyl succinimides of N-alkylpiperazines have the formula:

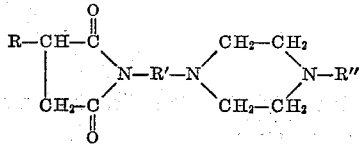

wherein R is a hydrocarbon radical having a molecular weight from about 400 to about 3000; that is, R is a hydrocarbon radical containing about 30 to about 200 carbon atoms; R' is a hydrocarbon radical containing from 1 to 3 carbon atoms; and R" is hydrogen or a hydrocarbon radical containing from 1 to 3 carbon atoms.

These N-substituted alkenyl succinimides can be prepared by reacting maleic anhydride with an olefinic hydrocarbon, followed by reacting the resulting alkenyl succinic anhydride with an N-($\beta$-aminoalkyl)piperazine. Such N-($\beta$-aminoalkyl)piperazines are exemplified by N-methyl-N'-($\beta$-aminoethyl)piperazine,
N-isopropyl-N'-($\beta$-aminoethyl)piperazine,
N-($\beta$-aminoisopropyl)piperazine, etc.

The "R" radical of the above formula, that is, the alkenyl radical, is derived from an olefin containing from 2 to 5 carbon atoms. Thus, the alkenyl radical is obtained by polymerizing an olefin containing from 2 to 5 carbon atoms to form a hydrocarbon having a molecular weight ranging from about 400 to about 3000. Such olefins are exemplified by ethylene, propylene, 1-butene, 2-butene, isobutene, and mixtures thereof. Since the methods of polymerizing the olefins to form polymers thereof is immaterial in the formation of the new compound described herein, any of the numerous processes available can be used therefor.

The preparation of N-substituted monoalkenyl succinimides derived from amine derivatives of piperazine can be described generally by the following equations, using a polymer of isobutene as an example of the alkenyl radical, and N-($\beta$-aminoethyl)piperazine as an example of an amine derivative of piperazine:

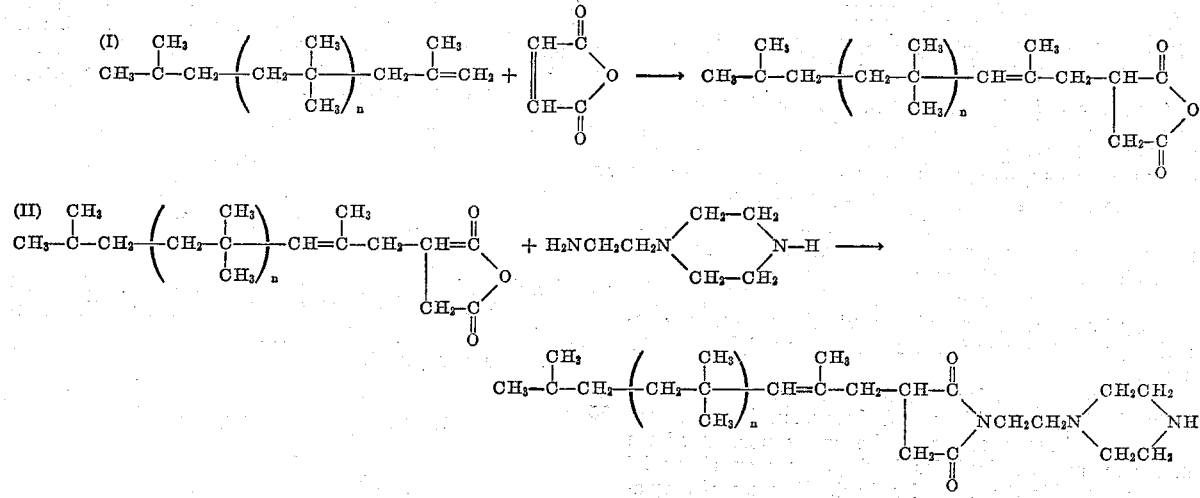
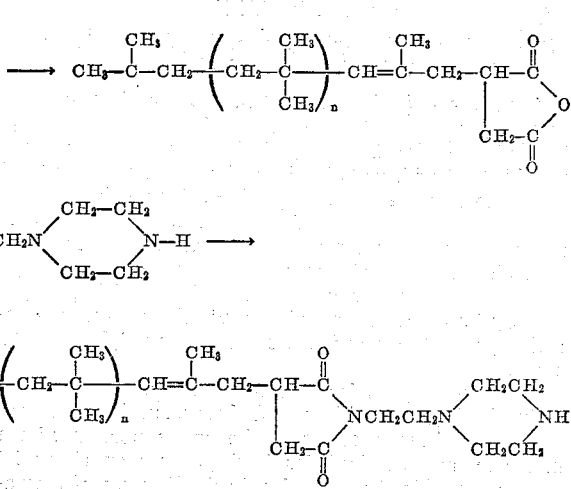

wherein n has a value of about 7 to about 50.

The above reaction between a polyolefin and maleic anhydride is an uncatalyzed addition reaction which should not be confused with a copolymerization reaction such as that obtained with a vinyl monomer and maleic anhydride. While the general reaction of an olefin and maleic anhydride is well known for olefins of low molecular weight (e.g., olefins of 18 carbon atoms), no previous work has been done with maleic anhydride and the high molecular weight olefins as described herein.

The reaction set forth and described hereinabove can proceed in a mol ratio of the polyolefin to the maleic anhydride of 1:1 to 1:10; preferably from 1:1 to 1:5. The reaction temperature can vary from 300° F. to 450° F. Because of the greater yield of products obtained thereby, it is preferred to use the higher temperature range (e.g., 375° F. to 450° F.)

In the second step of the reaction as exemplified by Equation II hereinabove, the yield of the imide is extremely high even though the reactants are used in equal molar ratios.

The reaction described by Equation II hereinabove can be made at 220° F. to 500° F., preferably from 300° F. to 400° F., preferably in an atmosphere of nitrogen. The alkenyl succinic anhydride and the piperazine derivative are reacted in about equal molar quantities.

Since the reaction between the polyolefin and maleic anhydride may not go to completion, the resulting alkenyl succinic anhydride may contain some unreacted polyolefin. As it may not be desirable to separate out this unreacted polyolefin at this stage, the resulting imide formed will contain this polyolefin as an impurity which can be a diluent in the formation of lubricating oil compositions. However, if it is so desired, this unreacted polyolefin can be removed by precipitation, for example, by acetone or methanol from a hydrocarbon solution.

The preparation of the alkenyl succinimides of this invention is illustrated in the following examples.

EXAMPLE I

*Preparation of Polybutenyl Succinic Anhydride*

A mixture of 1000 grams (1 mol) of a polyisobutene having a molecular weight of about 1000 and 98 grams (1 mol) of maleic anhydride was heated at 410° F. in a nitrogen atmosphere with agitation for a period of 24 hours. The reaction mixture was cooled to 150° F., and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride. The crude polybutenyl succinic anhydride thus prepared had a saponification number of 79.

EXAMPLE II

*Preparation of N-Ethylpiperazine Polybutenyl Succinic Anhydride of Example I Hereinabove*

A mixture of 18 grams (0.14 mol) of N-($\beta$-aminoethyl)piperazine and 200 grams (0.13 mol) of the polybutenyl succinic anhydride of Example I, hereinabove, was blended with agitation in a nitrogen atmosphere and heated to a temperature of 500° F., after which the absolute pressure was reduced to about 200 mm. Hg to remove excess amine reactant. The reaction mixture was then allowed to reach room temperature at this reduced pressure. The reaction product contained 2.59% nitrogen (theory 2.67%). Infra-red analysis showed that the reaction product was an imide containing a polybutene side chain.

The new compounds of this invention are more effective as lubricating oil additives than alkenyl succinimides having fewer nitrogen atoms in the amine portion of the molecule, and succinimides having less than about 30 carbon atoms in the alkenyl radical. The use of amylamine, for example, in place of the above-identified aminoalkylpiperazine described in this invention results in a product which is ineffective as a detergent in lubricating oil compositions.

As lubricating oil additives, the N-substituted alkenyl succinimides of this invention can be used in amounts of 0.1% to 80%, by weight, preferably 0.25% to 5%, by weight.

Table I hereinbelow sets forth data showing the effectiveness of the new compounds of this invention as lubricating oil additives.

The monoalkenyl succinimide used was an N-substituted alkenyl succinimide derived from N-($\beta$-aminoethyl) piperazine wherein the alkenyl radical had a molecular weight of approximately 1000, which alkenyl radical was a polymer of isobutene.

The tests were made in a Caterpillar L-1 engine according to Mil-L-2104 conditions for a period of 120 hours as described in the Coordinating Research Council Handbook, January 1946.

The "PD Nos." refer to the piston discoloration rating. After the engine test, the three piston lands were examined visually. To a piston land which was completely black was assigned a PD number of 800; to one which was completely clean, a PD number of 0; to those intermediate between completely black and completely clean were assigned PD numbers intermediate in proportion to the extent and degree of darkening.

The "G.D. Nos." refer to the percentage deposits in the piston ring grooves; an 0 evaluation being a clean groove; and a number of 100 being a groove full of deposits.

The base oils were California SAE 30 base oils.

TABLE I

|  | A | B |
|---|---|---|
| Additive: Succinimide, weight percent | 0.0 | 1.0 |
| Test results: |  |  |
| G.D. No | 39 | 1 |
| P.D. No | 800, 800, 800 | 25, 0, 0 |

It is readily seen from the data set forth hereinabove in Table I that alkenyl succinimides derived from amine derivatives of piperazine as described herein are effective as lubricating oil additives for the lubrication of internal combustion engines.

We claim:
1. The compounds, N-alkylpiperazine monoalkenyl succinimides wherein said alkenyl radical contains from 30 to 200 carbon atoms, and said alkyl radical contains from 1 to 3 carbon atoms.
2. The compounds, N-alkylpiperazine monoalkenyl succinimides wherein said alkenyl radical is a polymer of an olefin containing from 2 to 5 carbon atoms, said polymer having a molecular weight from 400 to 3000, and said alkyl radical contains from 1 to 3 carbon atoms.
3. The compound, N-alkylpiperazine monoalkenyl succinimide of the formula:

$$\begin{array}{c} O \\ \parallel \\ R-CH-C \\ | \quad\quad\quad\quad\quad CH_2-CH_2 \\ \quad\quad\quad N R'-N \quad\quad\quad NH \\ CH_2-C \quad\quad\quad CH_2-CH_2 \\ \parallel \\ O \end{array}$$

wherein R is a hydrocarbon radical containing from 30 to 200 carbon atoms, and R' is a hydrocarbon radical containing from 1 to 3 carbon atoms.

4. The compound, $$\begin{array}{c} O \\ \parallel \\ R-CH-C \\ | \quad\quad\quad\quad\quad CH_2-CH_2 \\ \quad\quad\quad N R'-N \quad\quad\quad NH \\ CH_2-C \quad\quad\quad CH_2-CH_2 \\ \parallel \\ O \end{array}$$

wherein R is a polyisobutene radical containing from 30 to 200 carbon atoms and R' is a hydrocarbon radical containing from 1 to 3 carbon atoms.

5. The compound, N-alkylpiperazine monoalkenyl succinimide of the formula:

$$\begin{array}{c} O \\ \parallel \\ R-CH-C \\ | \quad\quad\quad\quad\quad CH_2-CH_2 \\ \quad\quad\quad N-CH_2CH_2N \quad\quad NH \\ CH_2-C \quad\quad\quad CH_2-CH_2 \\ \parallel \\ O \end{array}$$

wherein R is a polyisobutene radical having a molecular weight of about 1,000.

6. The compound,
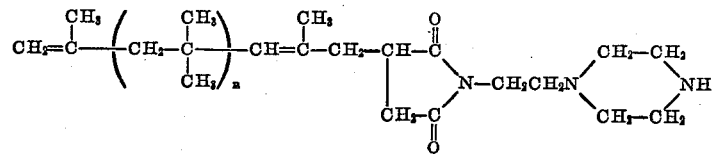
wherein *n* has a value of about 7 to about 50.
References Cited in the file of this patent
UNITED STATES PATENTS
| | | |
|---|---|---|
| 2,540,800 | Trigg et al. | Feb. 6, 1952 |
| 2,628,942 | Morris et al. | Feb. 17, 1953 |
| 2,904,548 | Rice et al. | Sept. 15, 1959 |
OTHER REFERENCES
Rice et al.: Jour. Amer. Chem. Soc. vol. 75, pp. 2261–2262 (1953).